US011593117B2

(12) United States Patent
Thakker et al.

(10) Patent No.: US 11,593,117 B2
(45) Date of Patent: Feb. 28, 2023

(54) COMBINING LOAD OR STORE INSTRUCTIONS

(71) Applicant: QUALCOMM Incorporated, San Diego, CA (US)

(72) Inventors: Harsh Thakker, Austin, TX (US); Thomas Philip Speier, Wake Forest, NC (US); Rodney Wayne Smith, Raleigh, NC (US); Kevin Jaget, Raleigh, NC (US); James Norris Dieffenderfer, Apex, NC (US); Michael Morrow, Wilkes Barre, PA (US); Pritha Ghoshal, Raleigh, NC (US); Yusuf Cagatay Tekmen, Raleigh, NC (US); Brian Stempel, Raleigh, NC (US); Sang Hoon Lee, Austin, TX (US); Manish Garg, Cary, NC (US)

(73) Assignee: Qualcomm Incorporated, San Diego, CA (US)

( * ) Notice: Subject to any disclaimer, the term of this patent is extended or adjusted under 35 U.S.C. 154(b) by 106 days.

(21) Appl. No.: 16/024,725

(22) Filed: Jun. 29, 2018

(65) Prior Publication Data

US 2020/0004550 A1     Jan. 2, 2020

(51) Int. Cl.
  *G06F 9/38*     (2018.01)
  *G06F 9/30*     (2018.01)

(52) U.S. Cl.
  CPC ........ *G06F 9/3853* (2013.01); *G06F 9/30043* (2013.01); *G06F 9/30098* (2013.01)

(58) Field of Classification Search
  CPC . G06F 9/3853; G06F 9/30043; G06F 9/30098

USPC ......................................................... 712/214
See application file for complete search history.

(56) References Cited

U.S. PATENT DOCUMENTS

| 5,751,984 | A  | 5/1998 | Chang et al. |
| 5,913,047 | A  | 6/1999 | Mahalingaiah et al. |
| 6,189,088 | B1 | 2/2001 | Gschwind |
| 6,349,383 | B1 | 2/2002 | Col et al. |

(Continued)

FOREIGN PATENT DOCUMENTS

| DE | 102014002840 A1 | 9/2014 |
| WO | 9914663 A2 | 3/1999 |

OTHER PUBLICATIONS

International Search Report and Written Opinion—PCT/US2019/037509—ISA/EPO—dated Sep. 30, 2019.

*Primary Examiner* — Chun Kuan Lee
(74) *Attorney, Agent, or Firm* — Muncy, Geissler, Olds & Lowe, P.C.

(57) ABSTRACT

Various aspects disclosed herein relate to combining instructions to load data from or store data in memory while processing instructions in a computer processor. More particularly, at least one pattern of multiple memory access instructions that reference a common base register and do not fully utilize an available bus width may be identified in a processor pipeline. In response to determining that the multiple memory access instructions target adjacent memory or non-contiguous memory that can fit on a single cache line, the multiple memory access instructions may be replaced within the processor pipeline with one equivalent memory access instruction that utilizes more of the available bus width than either of the replaced memory access instructions.

40 Claims, 6 Drawing Sheets

(56) References Cited

U.S. PATENT DOCUMENTS

| | | |
|---|---|---|
| 6,397,324 B1 * | 5/2002 | Barry .................... G06F 9/3004 |
| | | 711/149 |
| 6,564,297 B1 * | 5/2003 | Kosche ............... G06F 12/0802 |
| | | 711/118 |
| 6,889,318 B1 | 5/2005 | Wichman |
| 7,953,955 B2 | 5/2011 | Larin et al. |
| 7,966,609 B2 | 6/2011 | Serebryany |
| 8,065,504 B2 | 11/2011 | Yates et al. |
| 11,237,909 B2 * | 2/2022 | Enenkel .................. G06F 7/544 |
| 2002/0087955 A1 | 7/2002 | Ronen et al. |
| 2003/0033588 A1 | 2/2003 | Alexander |
| 2006/0253654 A1 | 11/2006 | Adachi |
| 2007/0260855 A1 | 11/2007 | Gschwind et al. |
| 2007/0266226 A1 | 11/2007 | Zeng et al. |
| 2008/0276075 A1 | 11/2008 | Luick |
| 2013/0086368 A1 | 4/2013 | Gschwind et al. |
| 2013/0339671 A1 * | 12/2013 | Williams, III ........ G06F 9/3826 |
| | | 712/217 |
| 2014/0052961 A1 * | 2/2014 | Vorbach .............. G06F 15/7821 |
| | | 712/33 |
| 2014/0258667 A1 * | 9/2014 | Sudhakar ............. G11C 7/1039 |
| | | 711/169 |
| 2014/0281208 A1 | 9/2014 | Fromm |
| 2015/0095625 A1 | 4/2015 | Hassanein et al. |
| 2015/0186282 A1 | 7/2015 | Rah et al. |
| 2016/0092236 A1 * | 3/2016 | Kanapathipillai ... G06F 9/3857 |
| | | 712/216 |
| 2017/0109165 A1 * | 4/2017 | Batley .................... G06F 9/3824 |
| 2017/0153825 A1 * | 6/2017 | Cho .......................... G11C 8/18 |
| 2017/0228233 A1 | 8/2017 | Mishaeli et al. |
| 2017/0249144 A1 | 8/2017 | Jaget et al. |
| 2019/0286563 A1 * | 9/2019 | Swamy ............... G06F 12/0842 |

* cited by examiner

COMBINING LOAD OR STORE INSTRUCTIONS

TECHNICAL FIELD

The various aspects and embodiments described herein generally relate to computer processors, and more particularly, to combining instructions to load data from or store data in memory while processing instructions in a computer processor.

BACKGROUND

In computer processing, a pipeline is a set of data processing elements connected in series, where the output from one element in the series is an input to a next element in the series. Instructions are typically fetched and placed into the pipeline sequentially. In this way, multiple instructions can be present in the pipeline as an instruction stream at any particular time, and the multiple instructions can be all processed simultaneously.

In general, a processor may support various load and store instruction types. However, some of these instructions may not take full advantage of a bandwidth of an interface between the processor and an associated cache or memory. For example, a particular processor architecture may have load (e.g., fetch) instructions and store instructions that target a single 32-bit word, while other processor architectures may supply a datapath to the cache of 64 or 128 bits. That is, compiled machine code of a program may include instructions that load a single 32-bit data word from a cache or other memory, while an interface (e.g., a bus) between the processor and the cache may be 128 bits wide, whereby 96 bits of the width are unused during the execution of each of those load instructions. Similarly, compiled machine code may include instructions that store a single 32-bit word of data in a cache or other memory, in which case 96 bits of the width are similarly unused during the execution of those store instructions.

Accordingly, based on the foregoing, there is a need for mechanisms that may better utilize the available bandwidth to and from caches and memory.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

According to various aspects, a method for combining load or store instructions may comprise identifying, in a processor pipeline, at least one pattern of multiple memory access instructions that reference a common base register and do not fully utilize an available bus width, determining that the multiple memory access instructions target adjacent memory or non-contiguous memory that can fit on a single cache line, and replacing, within the processor pipeline, the multiple memory access instructions with one equivalent memory access instruction that utilizes more of the available bus width than either of the replaced memory access instructions.

According to various aspects, an apparatus may comprise a processor configured to identify, in a pipeline associated with the processor, at least one pattern of multiple memory access instructions that reference a common base register and do not fully utilize an available bus width, determine that the multiple memory access instructions target adjacent memory or non-contiguous memory that can fit on a single cache line, and replace, within the pipeline associated with the processor, the multiple memory access instructions with one equivalent memory access instruction that utilizes more of the available bus width than either of the replaced memory access instructions.

According to various aspects, an apparatus may comprise means for identifying, in a processor pipeline, at least one pattern of multiple memory access instructions that reference a common base register and do not fully utilize an available bus width, means for determining that the multiple memory access instructions target adjacent memory or non-contiguous memory that can fit on a single cache line, and means for replacing, within the processor pipeline, the multiple memory access instructions with one equivalent memory access instruction that utilizes more of the available bus width than either of the replaced memory access instructions.

According to various aspects, a computer-readable storage medium may have computer-executable instructions recorded thereon, wherein the computer-executable instructions may be configured to cause a processor to identify, in a pipeline associated with the processor, at least one pattern of multiple memory access instructions that reference a common base register and do not fully utilize an available bus width, determine that the multiple memory access instructions target adjacent memory or non-contiguous memory that can fit on a single cache line, and replace, within the pipeline associated with the processor, the multiple memory access instructions with one equivalent memory access instruction that utilizes more of the available bus width than either of the replaced memory access instructions.

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of the various aspects and embodiments described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Various aspects and embodiments are disclosed in the following description and related drawings to show specific examples relating to exemplary aspects and embodiments. Alternate aspects and embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage, or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects and/or embodiments may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "electronic device," "user device," "user equipment" (or "UE"), "user terminal," "client device," "communication device," "wireless device," "wireless communications device," "handheld device," "mobile device," "mobile terminal," "mobile station," "handset," "access terminal," "subscriber device," "subscriber terminal," "subscriber station," "terminal," and variants thereof may interchangeably refer to any suitable mobile or stationary device. Accordingly, the above-mentioned terms may suitably refer to any one or all of cellular telephones, smart phones, personal or mobile multimedia players, personal data assistants, laptop computers, personal computers, tablet computers, smart books, palm-top computers, wireless electronic mail receivers, multimedia Internet-enabled cellular telephones, wireless gaming controllers, and similar devices with a programmable processor, memory, and circuitry, as would be apparent to a person having ordinary skill in the art.

Various aspects disclosed herein provide mechanisms to recognize certain patterns (or idioms) in which multiple "narrow" memory access instructions that do not fully utilize all the available bandwidth in a datapath between a processor and a cache and/or memory can be combined into a single "wider" memory access instruction that utilizes a larger portion of the available bandwidth. For example, many compilers may generate code with multiple load instructions (loads) or store instructions (stores) that target adjacent memory or memory likely to be on the same cache line. Generally, these load/store instructions are usually anywhere from one (1) to eight (8) bytes, although modern processors typically have at least a 128-bit datapath to and from associated caches and memories. As such, because hardware is generally unable to execute the multiple memory accesses in the same cycle, at least a portion of the available memory bandwidth may be unutilized or underutilized. If the patterns of multiple instructions that target adjacent memory or memory likely to be on the same cache line could be properly detected, the multiple instructions could potentially be combined into a single "wide" load/store instruction earlier in a pipeline and thereby improve utilization. For example, replacing multiple narrow load/store instructions with a single wide load/store instruction may leave a hole that can be filled in at the "front end" of a processor pipeline, resulting in more throughput at the "back end" of the processor pipeline. In another example, combining a "newer" load instruction with an "older" load instruction that has already passed through one or more pipeline stages may allow consumers of the newer load instruction to receive the appropriate data sooner.

As such, at a high level, the various aspects and embodiments described herein may be configured to recognize, detect, or otherwise identify certain patterns whereby an instruction pipeline includes multiple load instructions and/or store instructions that can be suitably combined into one equivalent instruction because the multiple load and/or store instructions do not fully utilize the available datapath to/from caches and memory, and the multiple load and/or store instructions target adjacent or contiguous memory or memory likely to be on the same cache line. In particular, the datapath may comprise a bus and the datapath bandwidth may be the maximum number of bits that the bus can convey in one operation (or cycle). In that context, the following example (illustrated with assembly code) shows a pattern in which multiple "smaller" or "narrow" load instructions can be combined into a "larger" or "wide" load instruction.

LDR X0, [SP, #8]; load X0 from memory at SP+8
LDR X1, [SP, #16]; load X1 from memory at SP+16

The two load (LDR) instructions provided above may be recognized as a pattern that could be replaced with a more bandwidth-efficient command or sequence of commands, because each LDR instruction uses 64 bits of bandwidth (e.g., a bit-width of 64 bits) such that memory is accessed twice (once to load X0 from memory at a positive offset of 8 from a stack pointer (SP) and a second time to load X1 from memory at a positive offset of 16 from the SP). In this example, assuming that the datapath to/from caches and memory is at least 128 bits, the two LDR instructions may be replaced with an equivalent (but more bandwidth-efficient) double load instruction that uses 128 bits of bandwidth (e.g., a bit-width of 128 bits) while accessing memory once, as follows:

LDRD X0, X1, [SP, #8]; load X0 and X1 from memory at SP+8

Accordingly, replacing multiple "narrow" instructions with a "wide" instruction may allow higher throughput to caches or memory and reduce overall instruction count. Various aspects and embodiments described herein may therefore include a processing system including at least one processor (e.g., a central processing unit (CPU)) configured to recognize certain patterns of memory access instructions (e.g., loads and/or stores) as replaceable and replace each such instruction pattern with an equivalent memory access instruction that utilizes more available bandwidth. In that regard, each pattern of replaceable memory access instructions may be transformed on-the-fly in the processing system each time the pattern is encountered in an instruction pipeline. Thus, implementing the various aspects and embodiments described herein may be done with substantially no changes to existing software. That is, software that can run on a device not including a processing system operating according to the aspects and embodiments described herein may be run on a device including such a processing system with no changes to the software. The device including the processing system operating according to the aspects and embodiments described herein may perform load and store operations in a more bandwidth-efficient manner relative to a device that does not operate according to the aspects and embodiments described herein by combining at least some load and store instructions during execution within an instruction pipeline.

Figure 1:
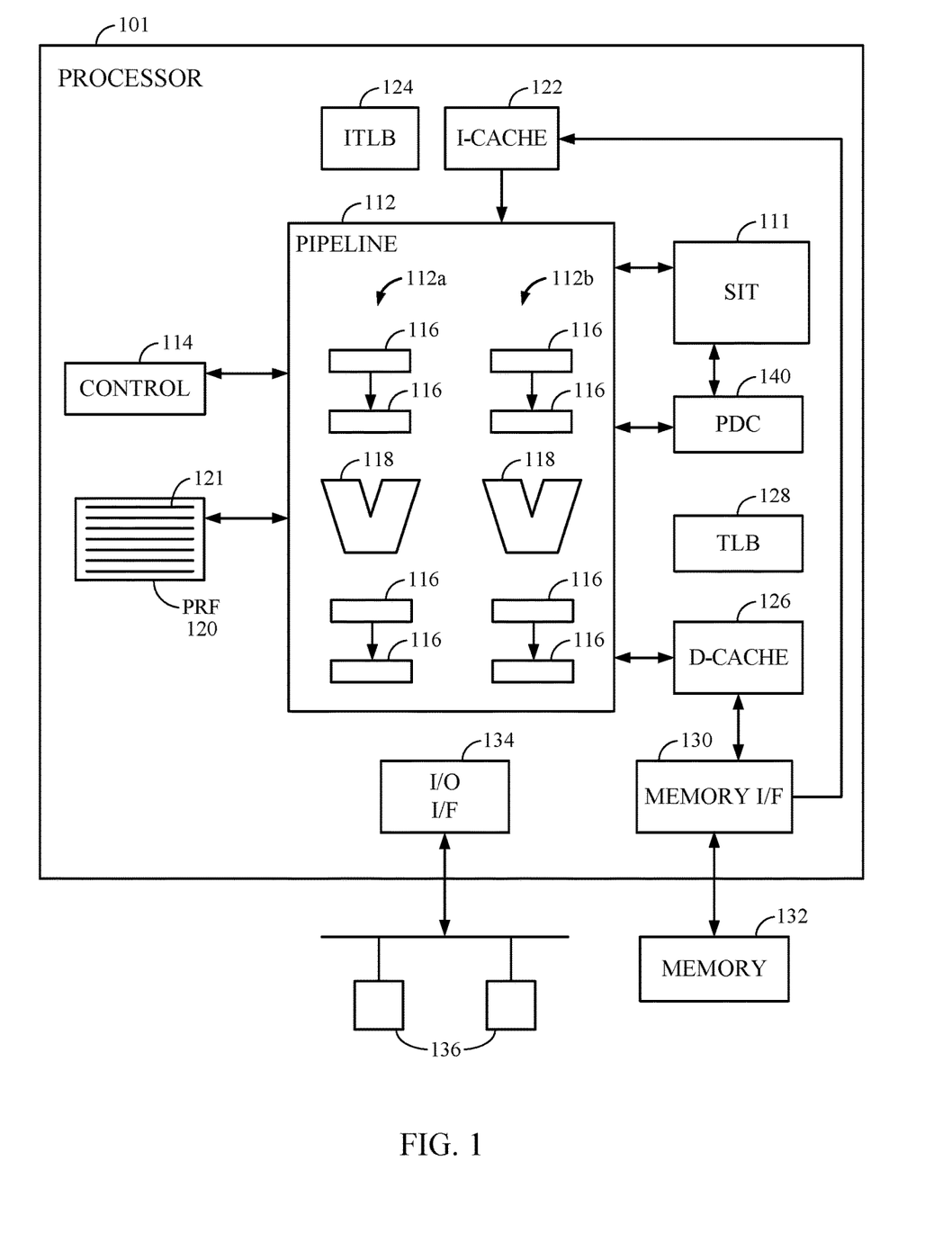
FIG. 1 illustrates an exemplary processor configured to recognize and replace certain patterns of multiple memory access instructions with more bandwidth-efficient memory access instructions, according to various aspects.

More particularly, according to various aspects, FIG. 1 illustrates an exemplary processor 101 configured to recognize and replace certain patterns of multiple memory access instructions with more bandwidth-efficient memory access instructions. Generally, the processor 101 may be used in any suitable computing device including, without limitation, a desktop computer, a laptop computer, a tablet computer, a smart phone, an Internet of Things (IoT) device, a wearable device, an automotive or telematics device, a robotic device, or any other existing or future-developed device configured to read data from and write data to a memory 132. Generally, the processor 101 may include numerous variations, and the processor 101 shown in FIG. 1 is for illustrative purposes and should not be considered limiting. For example, the processor 101 may be a central processing unit (CPU), a graphics processing unit (GPU), a digital signal processor (DSP), or another suitable processor.

In various embodiments, the processor 101 may be disposed on an integrated circuit that includes an instruction execution pipeline 112 and a storage instruction table (SIT) 111. Generally, the processor 101 may execute instructions in the instruction execution pipeline 112 according to control logic 114. In various embodiments, the instruction execution pipeline 112 may be a superscalar design with multiple parallel pipelines, including, without limitation, parallel instruction execution pipelines 112a and 112b. The instruction execution pipelines 112a, 112b may include various non-architected registers (or latches) 116 organized in pipe stages and one or more arithmetic logic units (ALU) 118. The instruction execution pipeline 112 may be coupled to a physical register file (PRF) 120 having various architected registers 121.

The instruction execution pipelines 112a, 112b may fetch instructions from an instruction cache (I-Cache) 122, while an instruction-side translation lookaside buffer (ITLB) 124 may manage memory addressing and permissions. Data may be accessed from a data cache (D-cache) 126, while a main translation lookaside buffer (TLB) 128 may manage memory addressing and permissions. In various embodiments, the ITLB 124 may be a copy of a part of the TLB 128. In other embodiments, the ITLB 124 and the TLB 128 may be integrated. Similarly, in various embodiments, the I-cache 122 and the D-cache 126 may be integrated or unified. Misses in the I-cache 122 and/or the D-cache 126 may cause an access to higher-level caches (such as an L2 or L3 cache) or main (off-chip) memory 132, which is under the control of a memory interface 130. The processor 101 may include an input/output interface (I/O IF) 134 that may control access to various peripheral devices 136.

As shown in FIG. 1, the processor 101 may also include a pattern detection circuit (PDC) 140. As used herein, the pattern detection circuit 140 may comprise any suitable circuitry (e.g., logic gates) configured to recognize certain patterns of multiple instructions configured to read or load data from caches and/or memory as well as patterns of instructions configured to write or store data in the caches and/or memory. For example, associated with the instruction execution pipeline 112 (or instruction execution pipelines 112a, 112b) is the SIT 111 that may be used to maintain or otherwise track various attributes associated with load, store, and/or other instructions that pass through the instruction execution pipelines 112a, 112b such that the patterns can be recognized based on the instruction attributes that are tracked in the SIT 111. In response to recognizing such instruction patterns, the multiple instructions making up the pattern may be replaced with an equivalent instruction that is more bandwidth-efficient than the replaced instructions.

Furthermore, in various embodiments, the data cache 126 may be organized in such a way as to return data based on different sizes and/or base address offsets for two or more load/store instructions that are combined or otherwise replaced with the equivalent instruction that is more bandwidth-efficient than the replaced instructions. For example, in various embodiments, the data cache 126 may be organized such that various bits of a cache line have physically independent bitlines, which may provide the ability to read all the bits of a selected cache line onto the physically independent bitlines without any word/byte conflicts. Similarly, this organization may allow data from the bitlines to be written into the memory 132 without any conflicts and allow certain bytes/words of the cache line to be read while simultaneously writing overlapping or non-overlapping bytes of the same cache line. In various embodiments, the data cache 126 may be further organized such that bitlines associated with different data words are physically interleaved. For example, bit0 of all the data words of the cache line may be kept physically adjacent, wherein the physically adjacent bitlines from various data words may be multiplexed together using a read column multiplexer to read a selected one of the data words. In a similar manner, two such read multiplexers may be implemented to simultaneously read two data words associated with two load instructions that are combined into a single wider load instruction. Similarly, a write column de-multiplexer may be implemented to write data associated with a store instruction to the bitlines of one of the selected data words. Two such write column demultiplexers may also be implemented to simultaneously write the data associated with two store instructions that are combined into a wider store instruction. When the two combined operations operate on same bytes of the cache line, a collision may occur. In particular, a collision between two reads may cause excessive loading on the bitline, and in such a case only one read column multiplexer is enabled, and the read data from the selected read column multiplexer is subsequently bypassed to the output of the other read column multiplexer. Between two writes, a collision may cause a high current condition, and in such a case, only one selected write column multiplexer is enabled.

Figure 2:
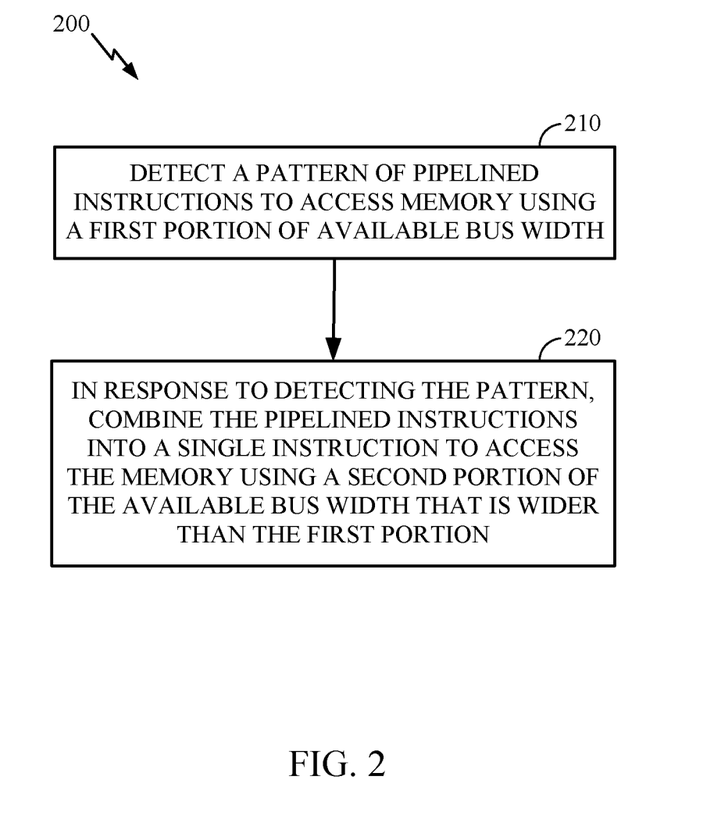
FIG. 2 illustrates an exemplary method for recognizing and replacing certain patterns of multiple memory access instructions with more bandwidth-efficient memory access instructions, according to various aspects.

According to various aspects, FIG. 2 illustrates an exemplary method 200 that may be performed by a suitable processor to recognize and replace certain patterns of multiple memory access instructions with more bandwidth-efficient memory access instructions. In at least one embodiment, the PDC 140 and the SIT 111 illustrated in FIG. 1 may be used in performing the method 200 illustrated in FIG. 2. In general, the method 200 depicts an aspect in which the processor detects multiple instructions that access adjacent memory or memory likely to be on the same cache line and replaces the multiple instructions with a more bandwidth-efficient instruction based on the multiple instructions utilizing less than all the memory bandwidth available to the processor, as mentioned above and described in more detail below.

At block 210, the method 200 begins with the processor (e.g., the PDC 140) detecting a pattern of multiple pipelined instructions to access memory using a first portion of available bus width. As described in more detail below, the processor may detect patterns wherein the multiple pipelined instructions are consecutive, non-consecutive, or interleaved load/store instructions that target adjacent (or contiguous) memory and/or memory likely to be on the same cache line. Also as described in more detail below, the processor may detect a pattern wherein the multiple instructions use a same base register with differing offsets, use addresses relative to a program counter that is increased as instructions execute, or use addresses relative to a stack pointer.

According to various embodiments, at block 220, the processor may combine the multiple pipelined instructions in response to detecting the pattern, wherein the multiple pipelined instructions may be combined into a single instruction to access the memory using a second portion of the available bus width that is wider than the first portion. The processor may replace the pattern of multiple pipelined instructions with the single instruction before passing the single instruction and possibly other (e.g., unchanged) instructions from a Decode stage to an Execute stage in a pipeline.

The various operations described above in relation to the method 200 illustrated in FIG. 2 may be performed using any suitable means having capabilities to perform the corresponding functions, such as circuitry and/or module(s) of a processor or processing system. For example, means for detecting a pattern of pipelined instructions to access memory using a first portion of available bus width may be implemented in the pattern detection circuit 140 shown in FIG. 1 in conjunction with the SIT 111 shown in FIG. 1. Furthermore, means for combining the pipelined instructions into a single instruction to access the memory using a second portion of the available bus width that is wider than the first portion may be implemented in any suitable circuit of the processor 101 shown in FIG. 1, including the pattern detection circuit 140, circuits within the pipeline(s) 112, the control logic 114, etc.

According to various aspects, a processor (e.g., the processor 101 in FIG. 1) may recognize consecutive (e.g., back-to-back) loads (e.g., instructions that load data from a location) or stores (e.g., instructions that store data to a location) as an instruction pattern targeting memory at contiguous positive offsets. For example:

STR W4, [X0]; 32b W4 to memory at X0+0
STR W5, [X0, #4]; 32b W5 to memory at X0+4
STRB W1, [SP, #−5]; 8b W1 to memory at SP-5
STRB W2, [SP, #−4]; 8b W2 to memory at SP-4
LDR D2, [X8, #8]; 64b D2 from memory at X8+8
LDR D7, [X8, #16]; 64b D7 from memory at X8+16

In the first pair of Store Register (STR) instructions, a 32-bit value from register W4 is written to a memory location located at a value stored in the X0 register, and then a 32-bit value from register W5 is written to a memory location four addresses (32 bits) higher than the value stored in the X0 register. In the second pair of Store Register Byte (STRB) instructions, an eight-bit value from register W1 is written to a memory location located five addresses lower than a value stored in the stack pointer (SP), and then an eight-bit value from register W2 is written to a memory location located four addresses lower than the value stored in the SP (i.e., one address or eight bits higher than the location to which W1 was written). In the third pair of Load Register (LDR) instructions, a 64-bit value is read into register D2 from a memory location located eight addresses higher than a value stored in register X8, and then a 64-bit value is read into register D7 from a memory location located sixteen addresses higher than the value stored in register X8 (i.e., eight addresses or 64 bits higher than the location read from in the first LDR instruction). A processor operating according to various aspects described herein may recognize consecutive instructions accessing memory at contiguous positive offsets, such as those above, as a pattern that may be replaced by a more bandwidth-efficient instruction. The processor may then replace the consecutive instructions with the more bandwidth-efficient instruction as described above with reference to FIG. 2. For example, the first pair of STR instructions may be replaced with an equivalent Store Register Doubleword (STRD) instruction that writes the 32-bit values from registers W4 and W5 to the memory location located at a value stored in the X0 register. Similarly, the second pair of STRB instructions may be replaced with an equivalent Store Register Halfword (STRH) instruction and the third pair of LDR instructions may be replaced with an equivalent Load Register Doubleword (LDRD) instruction. As will be apparent to those skilled in the art, in a 64-bit instruction set architecture, an integer LDR or equivalent instruction may load/store 64 bits or 32 bits depending on the destination register (e.g., 64 bits when the destination register is an X register or 32 bits when the destination register is a W register), while a Load Register Halfword (LDRH) instruction loads 16 bits and a Load Register Byte (LDRB) instruction loads 8 bits. Those skilled in the art will further appreciate that store instructions and the examples provided herein may generally follow this notation.

According to various aspects, the processor may also recognize consecutive load/store instructions of different sizes as an instruction pattern targeting memory at contiguous positive or negative offsets. For example, the following instruction patterns are illustrative of cases where consecutive store instructions and consecutive load instructions of different sizes that target memory at contiguous positive offsets:

STR X4, [X0]; 64b X4 to memory at X0+0
STR W5, [X0, #8]; 32b W5 to memory at X0+8
LDRB W1, [X0]; 8b W1 from memory at X0
LDRH W2, [X0, #1]; 16b W2 from memory at X0+1

In the first pair of STR instructions, a 64-bit value from register X4 is written to a memory location located at a value stored in the X0 register, and then a 32-bit value from register W5 is written to a memory location eight addresses (64 bits) higher than the value stored in the X0 register. In the second pair of instructions, a first Load Register Byte (LDRB) instruction reads an 8-bit value into register W1 from a memory location located at a value stored in register X0, and then a Load Register Halfword (LDRH) instruction reads a 16-bit value into register W2 from a memory location located one address (8 bits) higher than the value stored in register X0. A processor operating according to various aspects described herein may recognize such consecutive instructions as accessing memory of different sizes at contiguous positive offsets, which may be replaced with an equivalent more bandwidth-efficient instruction. Furthermore, as described in further detail above with respect to FIG. 1, a data cache (e.g., data cache 126) may be organized in such a way as to handle the different sizes associated with the load/store instructions combined into the equivalent bandwidth-efficient instruction.

According to various aspects, the processor may also recognize consecutive load/store instructions targeting memory at contiguous negative offsets as a pattern that can be replaced with an equivalent more bandwidth-efficient instruction. For example:

STR W6, [X0, #4]; 32b W6 to memory at X0+4
STR W7, [X0]; 32b W7 to memory at X0+0

In the above pair of STR instructions, a 32-bit value from register W6 is written to a memory location four addresses (32 bits) higher than a value stored in the X0 register, and then a 32-bit value from register W7 is written to a memory location located at the value stored in the X0 register. In a similar manner as described above, a processor operating according to various aspects described herein may recognize such consecutive instructions as accessing memory at contiguous negative offsets, which may be replaced by an equivalent more bandwidth-efficient instruction. For example, the two STR instructions may be replaced with an equivalent instruction that writes a 64-bit value including the 32-bit value from register W7 and the 32-bit value from register W6 to the memory location starting at the value stored in the X0 register.

According to various aspects, the processor may also recognize consecutive load/store instructions with base-updates as a pattern that can be replaced with an equivalent more bandwidth-efficient instruction. As used herein, the term "base-update" may generally refer to an instruction that alters the value of an address-containing register used in a pattern of instructions. A processor may recognize that a pattern of instructions targets adjacent memory when base-updates in the instructions are considered. For example, in the below pair of LDR instructions, data is read from adjacent memory locations due to the base-update in the first LDR instruction:

LDR X7, [X0], #8; 64b from memory at X0; X0=X0+8
LDR X3, [X0]; 64b from memory at X0

The processor operating according to various aspects described herein may recognize consecutive load/store instructions with base-updates, such as those above, as a pattern that may be replaced by a load/store instruction that is more bandwidth-efficient, and then replace the instructions as described above with reference to FIG. 2.

According to various aspects, the processor may also recognize consecutive program-counter-relative (PC-relative) load/store instructions as a pattern that can be replaced with an equivalent more bandwidth-efficient instruction. For example, the processor may recognize that a pattern of load/store instructions targets adjacent memory when changes to the program counter (PC) are considered. For example, in the below pair of instructions, data is read from adjacent memory locations due to the PC changing after the first instruction is executed:

LDR R1, [PC, #20]; PC=X, load from memory at X+20+8
LDR R2, [PC, #20]; load from memory at X+4+20+8

In the above pair of instructions, a 32-bit value is read from a memory location located 28 locations (224 bits) higher than a first value (X) of the PC, the PC is advanced four locations, and then another 32-bit value is read from the memory location located 32 locations (256 bits) higher than the first value (X) of the PC. Thus, the above pair of instructions may be replaced with the following equivalent instruction:

LDRD R1, R2, [PC, #20]

According to various aspects, the processor may also recognize consecutive load/store instructions targeting non-contiguous memory with negative offsets likely on the same cache line as a replaceable pattern. For example:

LDR X1, [SP, #32]; 64b X1 from memory at SP+32
LDR X2, [SP, #8]; 64b X2 from memory at SP+8

In the above pair of LDR instructions, a 64-bit value is read into register X1 from a memory location 32 addresses higher than a value stored in the stack pointer, and then a 64-bit value is read into register X2 from a memory location 8 addresses higher than the value stored in the stack pointer. In other words, the second LDR instruction targets memory spanning from SP+8 through SP+16 and the first LDR instruction targets memory spanning from SP+32 through SP+40, whereby the memory targeted in the two LDR instructions is non-contiguous. However, the overall range of memory spanning from SP+8 through SP+40 is 32 addresses or 256 bits. Accordingly, assuming a configuration in which the size of a cache line is 256 bits or more, then the two instructions can be combined to read the relevant data from a single cache line. Those skilled in the art will appreciate that this will usually be the case, as modern processors have cache lines that are typically 64 bytes (512 bits) or 128 bytes (1024 bits).

According to various aspects, the processor may also recognize consecutive load/store instructions with base updates that target non-contiguous memory with positive offsets likely on the same cache line as a replaceable pattern. For example:

LDR X3, [X10, #16]; 64b X3 from memory at X10; X10=X10+16
LDR X4, [X10, #8]; 64b X4 from memory at X10+8

In the above pair of LDR instructions, a 64-bit value is read into register X3 from a memory location located at a value stored in register X10, and the value stored in register X10 is then incremented 16 addresses (or 128 bits). The second LDR instruction then reads a 64-bit value into register X4 from a memory location eight addresses (64 bits) higher than the updated value stored in register X10. Accordingly, the entire memory range targeted in the two LDR instructions again spans 32 addresses or 256 bits, whereby the two LDR instructions can be combined to read the relevant data from a single cache line assuming the cache line is 256 bits or more in size.

According to various aspects, the processor may also recognize multiple non-consecutive (e.g., non-back-to-back) load/store instructions as a pattern that can be suitably replaced with a more bandwidth-efficient instruction due to targeting adjacent memory or memory likely to be on the same cache line. In particular, if there are no intervening instructions that will alter address registers referenced in the multiple load/store instructions that are targeting the adjacent memory or the memory likely to be on the same cache line, then the load/store instructions may be combined and replaced with a more bandwidth-efficient instruction in a generally similar manner as consecutive load/store instructions that target adjacent memory or memory likely to be on the same cache line. For example, in the below set of instructions, data is read from adjacent memory locations in non-consecutive LDR instructions and the two intervening instructions do not alter the memory locations that the non-consecutive LDR instructions are reading from.

LDR X1, [X0]; 64b X1 from memory at X0
MOV X2, #42; does not alter address register (X0)
ADD X3, X2, #20; does not alter address register (X0)
LDR X4, [X0, #8]; 64b X4 from memory at X0+8

In the above set of instructions, the first and fourth instructions may be replaced with a single LDRD instruction targeting the sixteen adjacent memory locations starting at the location specified by the value in the X0 register because the second and third instructions do not alter any of those sixteen adjacent memory locations. Thus, the four instructions shown above may be replaced with the following equivalent instruction set:

LDRD X1, X4, [X0]
MOV X2, #42
ADD X3, X2, #20

While the replacement LDRD instruction (for the original first and fourth instructions) is shown in the list above as occurring prior to the intervening MOV and ADD instructions, this order is for convenience only and is not intended to be limiting of the order of the instructions as they are passed to an Execute stage of a pipeline. In particular, the replacement LDRD instruction may be passed to an Execute stage of a pipeline before, between, or after the intervening instructions, as the LDRD instruction is essentially independent from the intervening MOV and ADD instructions.

The patterns described above may occur in non-consecutive (e.g., non-back-to-back) variations. Thus, the processor operating according to the present disclosure may recognize any of the previously described patterns with intervening instructions that do not alter any of the targeted memory locations and replace the recognized patterns with equivalent instructions that are more bandwidth-efficient.

For example, in each of the below sets of instructions, non-consecutive instructions read data from or store data in adjacent memory locations and/or memory likely to be on the same cache line, and the intervening instructions do not alter any of the memory locations accessed in the replaceable non-consecutive instructions.

LDR R0, [SP, #8]; load R0 from memory at SP+8
MOV R3, #60; does not alter memory at SP+8 or SP+12
LDR R1, [SP, #12]; load R1 from memory at SP+12
STR R4, [R0]; 32b R4 to memory at R0+0
MOV R2, #21; does not alter memory at R0 or R0+4
STR R5, [R0, #4]; 32b R5 to memory at R0+4
STRB R1, [SP, #−5]; 8b R1 to memory at SP-5
MOV R2, #42; does not alter memory at SP-5 or SP-4
STRB R2, [SP, #−4]; 8b R2 to memory at SP-4

VLDR D2, [R8, #8]; 64b D2 from memory at R8+8
ADD R1, R2; does not alter memory at R8+8 or R8+16
VLDR D7, [R8, #16]; 64b D2 from memory at R8+16

In each of the above sets of instructions, memory at adjacent locations and/or likely to be on the same cache line is targeted by instructions performing similar operations with intervening instructions that do not alter the memory locations. The processor operating according to various aspects described herein may recognize non-consecutive instructions, such as those above, as a pattern that may be replaced by an instruction that is more bandwidth-efficient, and then replace the instructions as described above while leaving the intervening instructions unchanged.

In another example, non-consecutive loads or stores with base-updates may be recognized as a pattern that may be replaced with a more bandwidth-efficient instruction. For example, in the below set of instructions, data is read from adjacent memory locations due to the base-update in the first instruction:

LDR R7, [R0], #4; 32b from memory at R0; R0=R0+4
ADD R1, R2; does not alter memory at R0 or R0+4
LDR R3, [R0]; 32b from memory at R0

Thus, the LDR instructions may be replaced by an LDRD instruction, as below:

LDRD R7, R3, [R0], #4
ADD R1, R2

In still another example, non-consecutive PC-relative load or store instructions may be recognized as a pattern that may be replaced with a more bandwidth-efficient instruction. For example, in the below set of instructions, data is read from adjacent memory locations due to the PC changing after the first LDR instruction:

LDR R1, [PC, #20]; PC=X, load from memory at X+20+8
MOV R2, #42; does not alter memory at X+28 or X+32
LDR R3, [PC, #16]; load from memory at X+8+16+8

Thus, the LDR instructions may be replaced by an LDRD instruction, as below:

LDRD R1, R3, [PC, #20]
MOV R2, #42

According to various aspects, a special pattern applicable to non-consecutive variations may be where there is an opportunity to combine multiple dynamic instances of the same load or store instruction. For example, in the following set of instructions, a backward branch may result in multiple loads that target adjacent memory, whereby two dynamic instances of the load to register X5 can be combined into one:

loop: LDR X5, [X2], #8; 64b X5 from memory at X2; X2=X2+8
CMP X5, X0; compare values in X5 and X0
B.NE loop; if X5 does not equal X0, branch back to Load In another example, in the following set of instructions, the first and the last instructions are multiple instances of the same load instruction and the four intervening instructions do not alter the base register associated with the two load instructions, which can therefore be suitably combined into a single load instruction:

LDRB W3, [X1], #1
SUBS WZR, W2, #0x1
CCMP W2, W3, #0, CS
B.EQ {pc}-0x10; 0x3ffb7ff6548
LDRB W2, [X0], #1
LDRB W3, [X1], #1

According to various aspects, the processor operating according to the present disclosure may further recognize any of the previously described patterns interleaved with one or more other patterns such that two or more patterns of loads/stores may be eligible for combining into equivalent instructions that are more bandwidth-efficient. That is, in a group of instructions, two or more patterns of multiple loads or multiple stores may be eligible to be replaced with more bandwidth-efficient load/store instructions. For example, in the below set of instructions, data is read from adjacent memory locations by a first pair of instructions and from a different set of adjacent memory locations by a second pair of instructions.

A: LDR R1, [R0], #4; 32b from memory at R0; R0=R0+4
    B: LDR R7, [SP]; 32b from memory at SP
    C: LDR R4, [R0]; 32b from memory at R0 (pair with A)
    D: LDR R5, [SP, #4]; 32b from memory at SP+4 (pair with B)

The processor operating according to various aspects described herein may recognize interleaved patterns of instructions that may be replaced with more bandwidth-efficient instructions. Thus, when the processor operating according to various aspects described herein encounters the above exemplary pattern, the first and third instructions may be replaced with a more bandwidth-efficient instruction (e.g., a first LDRD instruction) and the second and fourth instructions may be replaced with another more bandwidth-efficient instruction (e.g., a second LDRD instruction).

According to various aspects, any of the previously described patterns may be detected by the processor examining a set of instructions in an instruction set window of a given width of instructions. That is, the processor operating according to various aspects described herein may examine a number of instructions in an instruction set window to detect patterns of instructions that access adjacent memory locations and may be replaced with instructions that are more bandwidth-efficient. For example, any of the previously described patterns of instructions may be detected and replaced with more bandwidth-efficient (e.g., "wider") instructions during execution. In some cases, the pattern recognition and instruction replacement may be performed in a pipeline of the processor, such as pipelines 112 shown in FIG. 1.

Figure 3:
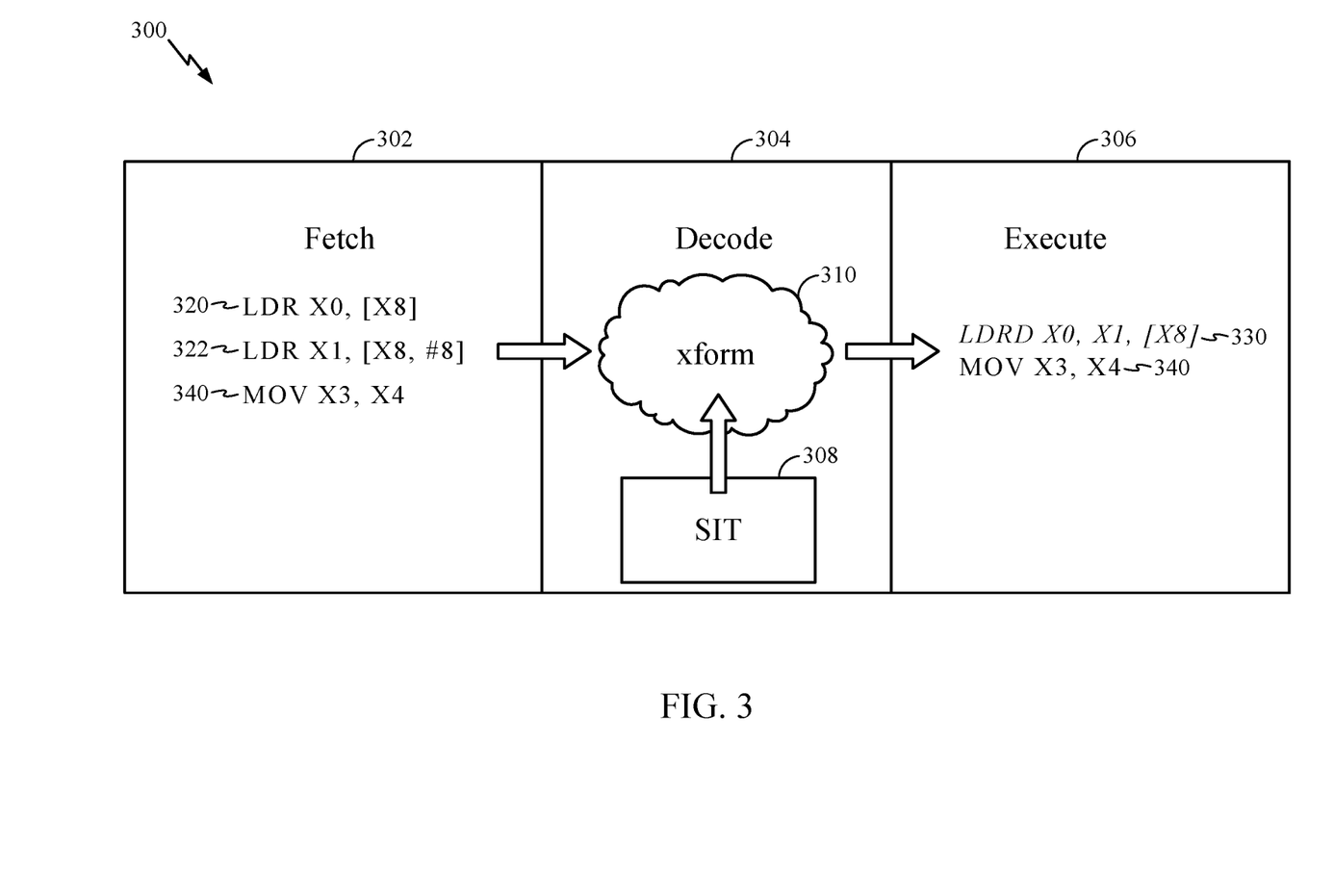
FIG. 3 illustrates an exemplary processor pipeline, according to various aspects.

According to various aspects, FIG. 3 illustrates an exemplary basic three-stage processor pipeline 300 that may be included in a processor operating according to various aspects described herein. The three stages of the exemplary processor pipeline 300 are a Fetch stage 302, a Decode stage 304, and an Execute stage 306. During execution of a program by a processor (e.g., processor 101 in FIG. 1), instructions are fetched from memory and/or a cache by the Fetch stage 302, passed to the Decode stage 304 and decoded, and then passed to the Execute stage 306 and executed. In the illustrated example, the processor pipeline 300 is three-wide, in that each stage can contain up to three instructions. However, the present disclosure is not so limited and applies to pipelines that have other widths and/or stages (e.g., memory access and register write back stages as in a reduced instruction set computer (RISC) pipeline).

As illustrated in FIG. 3, the group of instructions illustrated in the Fetch stage 302 is passed to the Decode stage 304, where the instructions are transformed via "xform" logic 310. After transformation, the instructions are pipelined into the Execute stage 306. The "xform" logic 310 may recognize that the load instructions 320, 322 can be replaced with a more bandwidth-efficient instruction, in this case a single LDRD instruction 330. As illustrated, the two original load instructions 320, 322 are not passed to the Execute stage. Instead, the replacement LDRD instruction 330 that replaced the two original LRD instructions 320, 322 is illustrated in italic text. Another instruction 340 that was not altered is also shown. According to various aspects, a table referred to herein as a storage instruction table (SIT) 308 may be associated with the Decode stage 304 and used to maintain certain attributes of loads/stores that pass through the Decode stage 304 such that the "xform" logic 310 can recognize replaceable patterns of instructions based on the instructions moving through the Decode stage 304 and/or instructions in older groups that have already passed through the Decode stage 304.

Figure 4:
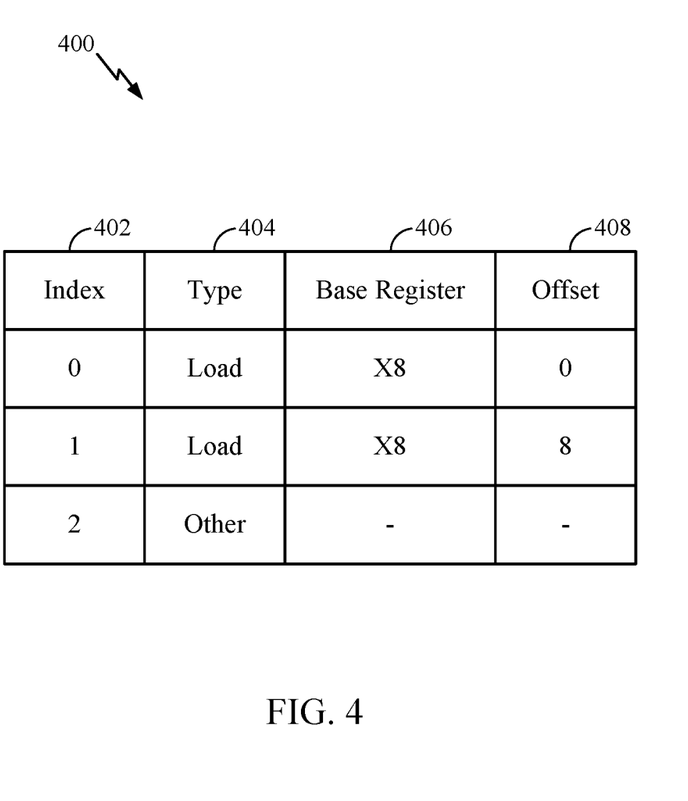
FIG. 4 illustrates an exemplary storage instruction table (SIT) that can be used to track information associated with recent instructions, according to various aspects.

According to various aspects, FIG. 4 illustrates an exemplary storage instruction table (SIT) 400 that can be used to track information associated with recent instructions. In FIG. 4, the SIT 400 is illustrated as it would be populated for the group of instructions shown in FIG. 3 when the instructions reach the Decode stage 304. Information regarding each instruction that passes through the Decode stage 304 may be stored in one row of the SIT 400, which includes four columns in the illustrated example. In particular, an Index column 402 may identify an instruction position relative to other instructions currently in the SIT 400 and a Type column 404 may identify the type of the instruction (e.g., either "Load," "Store," or "Other," with "Other" used for any instructions that neither read from nor write to memory or cache). Furthermore, a Base Register column 406 may indicate the register used as the base address in the corresponding load or store instruction and an Offset column 408 may store the immediate value added to the base register when the instruction is executed. Furthermore, although the SIT 400 is illustrated in FIG. 4 as only containing information about instructions from the Decode stage 304, those skilled in the art will appreciate that the disclosure is not so limited, as the SIT 400 may contain information about instructions in other suitable stages. For example, in a processor with a longer pipeline, the SIT 400 could have information about instructions that have already passed through the Decode stage 304.

According to various aspects, a processor operating according to the various aspects described herein may apply logic to recognize one or more patterns of multiple instructions that can be replaced with a single instruction, wherein the patterns may include but are not limited to those described above. If a pattern of instructions that may be replaced is recognized, then the processor may transform the instructions into another equivalent instruction as the instructions flow towards the Execute stage 306.

According to various aspects, to detect the patterns and consolidate instructions as described herein, the pattern detection circuit that acts on the SIT 400 and the processor pipeline 300 may recognize the previously described patterns of load or store instructions that access adjacent memory or memory likely to be on the same cache line. In particular, the pattern detection circuit may compare the Base Register and Offset of each instruction of Type "Load" with the Base Register and Offset of every other instruction of Type "Load" and determine whether any two "Load" instructions have a same Base Register and Offsets that cause the two "Load" instructions to access adjacent memory locations or non-contiguous memory likely to be on the same cache line. The pattern detection circuit may also determine if changes to a Base Register that occur between compared "Load" instructions cause two instructions to access adjacent memory or non-contiguous memory likely to be on the same cache line. When the pattern detection circuit determines that two "Load" instructions access adjacent memory or memory likely to be on the same cache line, then the pattern detection circuit replaces the two "Load" instructions with an equivalent, more bandwidth-efficient replacement load instruction. The pattern detection circuit then passes the replacement instruction to the Execute stage 306. The pattern detection circuit may also perform similar comparisons and replacements for instructions of Type "Store." The pattern detection circuit may also determine PC values that will be used for "Load" instructions affecting PC-relative memory locations and then use the determined PC values (and any offsets included in the instructions) to determine if any two "Load" instructions access adjacent memory or memory likely to be on the same cache line. The pattern detection circuit may perform similar PC value determinations for "Store" instructions affecting PC-relative memory locations and use the determined PC values to determine if any two "Store" instructions access adjacent memory or memory likely to be on the same cache line.

Figure 5:
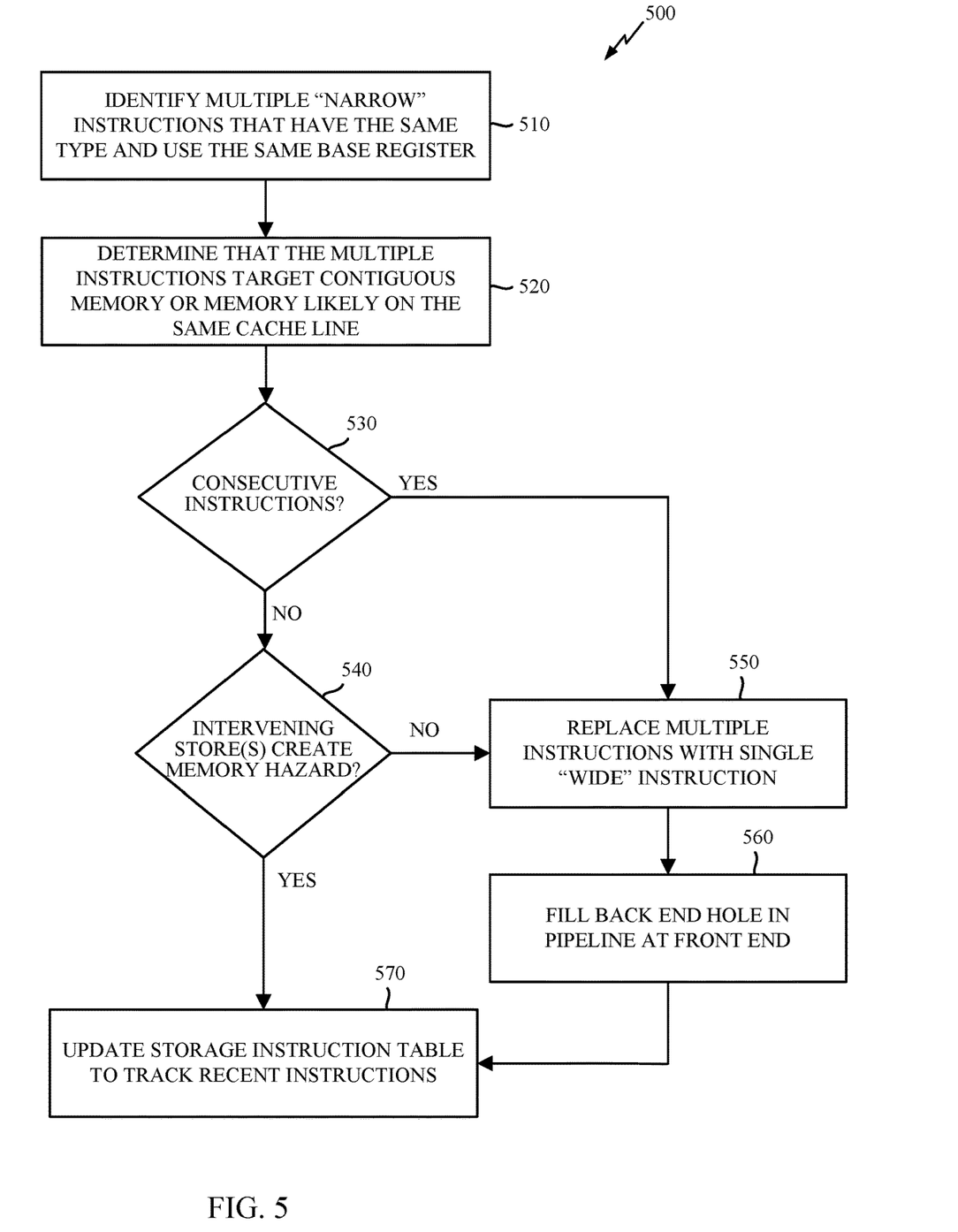
FIG. 5 illustrates another exemplary method for recognizing and replacing certain patterns of multiple memory access instructions with more bandwidth-efficient memory access instructions, according to various aspects.

According to various aspects, FIG. 5 illustrates another exemplary method 500 for recognizing and replacing certain patterns of multiple memory access instructions with more bandwidth-efficient memory access instructions as described in further detail above. More particularly, at block 510, multiple "narrow" instructions that have the same type and use the same base register may be identified, wherein the term "narrow" as used herein is contemplated to mean that the corresponding instructions access memory or a cache using less than the full available bandwidth in a datapath to/from the memory and/or cache (e.g., a 32-bit or 64-bit load/store in a system having a 128-bit datapath to/from the memory and/or cache). In various embodiments, at block 520, the multiple memory access instructions (e.g., multiple loads or multiple stores) may be determined to target contiguous memory or memory likely to be on the same cache line, which may indicate that the multiple memory access instructions are potentially combinable. For example, the multiple memory access instructions may be combinable where the instructions appear consecutively in the pipeline or where the instructions appear non-consecutively in the pipeline and any intervening instructions do not write to the same base register as the potentially combinable instructions (i.e., the intervening instructions do not create a memory hazard). As such, in response to determining at block 530 that the multiple instructions appear consecutively in the pipeline, the multiple instructions may be replaced at block 550 with a single "wider" instruction that performs an equivalent function as the combined instructions while also utilizing more of the available bandwidth in the datapath to/from the memory and/or cache.

Alternatively, in response to determining at block 530 that the multiple instructions do not appear consecutively in the pipeline, the multiple instructions may still be replaced at block 550 in response to block 540 resulting in a determination that the intervening instructions do not create a memory hazard. For example, if the intervening instructions do not include any store instructions, then the intervening instructions do not create a memory hazard and the multiple load/store instructions can be appropriately replaced with an equivalent wider instruction at block 550. However, if the intervening instructions include one or more store instructions, the intervening instructions may be determined to create a memory hazard such that the multiple load/store instructions are not combined or otherwise replaced with an equivalent wider instruction unless certain conditions are met. More particularly, if the intervening store instruction(s) use the same base register as the multiple load/store instructions being combined and there are no overlapping bytes between the intervening store instruction(s) and the combined load/store instructions, then no memory hazard exists and the multiple load/store instructions can be appropriately replaced with an equivalent wider instruction at block 550. Otherwise, when the intervening instructions include one or more store instructions that either use a different base register than the multiple load/store instructions being combined or there are one or more overlapping bytes between the intervening store instruction(s) and the combined load/store instructions, a potential memory hazard may exist and the instructions may not be combined, in which case the method 500 may proceed directly to block 570.

In various embodiments, when the multiple narrow load/store instructions are determined to be combinable into the equivalent wider load/store instruction, the memory access to service the combined instructions may be completed in a single cycle rather than multiple cycles as would otherwise be required if the instructions had not been combined. Furthermore, combining the multiple narrow load/store instructions into the one equivalent wide instruction may leave a hole in the back end of the processor pipeline. Accordingly, in various embodiments, one or more earlier stages in the processor pipeline may fill the hole at block 560, which may advantageously improve processor throughput at the back end. In various embodiments, at block 570, the storage instruction table may be updated to track recent instructions, including any instructions that were combined into a wider instruction and instructions that were not combined into a more bandwidth-efficient instruction so that all instructions passing through the pipeline can be evaluated for potential combination/replacement with one or more subsequent instructions that may pass through the pipeline.

Figure 6:
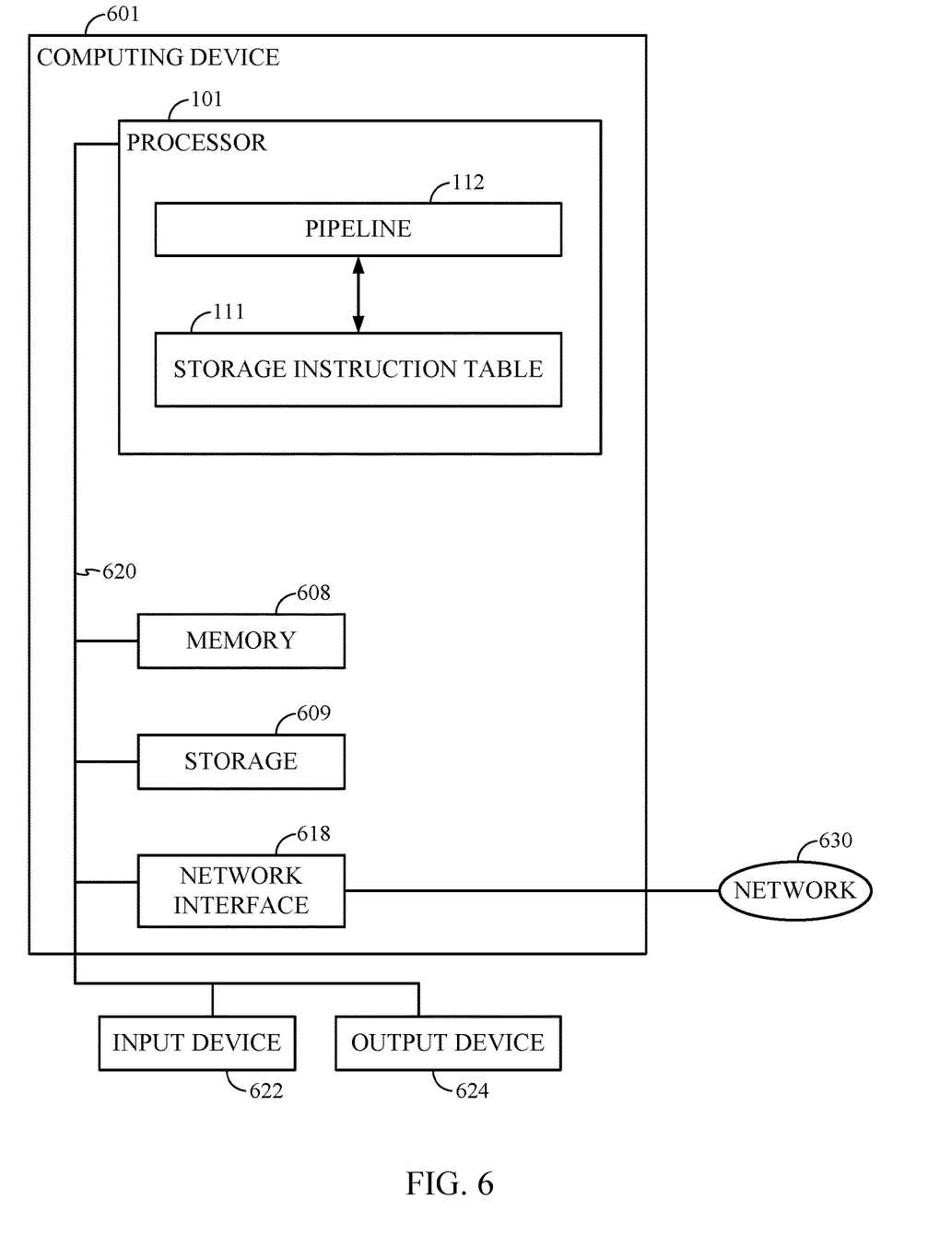
FIG. 6 illustrates an exemplary computing device that may advantageously implement the various aspects and embodiments described herein.

FIG. 6 illustrates an exemplary computing device 601 that may advantageously implement the various aspects and embodiments described herein. In particular, as shown in FIG. 6, the computing device 601 may integrate the processor 101 configured to detect patterns of multiple "narrow" instructions that access memory using less than all the available bandwidth (e.g., bus-width) and replace the patterns with "wider" instructions that use a larger portion of the available bandwidth. All the apparatuses and methods depicted in FIG. 1 through FIG. 5 may be included in or performed by the computing device 601. The computing device 601 may also be connected to other computing devices via a network 630. In general, the network 630 may be a telecommunications network and/or a wide area network (WAN). In a particular aspect, the network 630 is the Internet. Generally, the computing device 601 may be any suitable device that includes a processor configured to implement the techniques described herein to replace certain memory access instructions (e.g., load and/or store instructions) that do not fully utilize the available bandwidth in a path to and from one or more caches and/or memories with equivalent instructions that utilize a larger portion of the available bandwidth (e.g., a desktop computer, a server, a laptop computer, a tablet computer, a smart phone, an Internet of Things (IoT) device, a wearable device, an automotive or telematics device, a robotic device, or any other existing or future-developed device configured to read data from and write data to a memory).

The computing device 601 generally includes the processor 101 connected via a bus 620 to a memory 608, a network interface device 618, a storage 609, an input device 622, and an output device 624. The computing device 601 generally operates using a suitable operating system (not explicitly shown in FIG. 6). Any operating system supporting the functions disclosed herein may be used. The processor 101 is included to be representative of a single processor, multiple processors, a single processor having multiple processing cores, and the like. The network interface device 618 may be any type of network communications device allowing the computing device 601 to communicate with other computing devices via the network 630.

In various embodiments, the storage 609 may be a persistent storage device. Although the storage 609 is shown in FIG. 6 as a single unit, those skilled in the art will appreciate that the storage 609 may be a combination of fixed and/or removable storage devices, such as fixed disc drives, solid state drives, storage area network (SAN) storage, network-attached storage (NAS), removable memory cards, optical storage, etc. The memory 608 and the storage 609 may be part of one virtual address space spanning multiple primary and/or secondary storage devices.

In various embodiments, the input device 622 may be any suitable device operable to enable a user to provide input to the computing device 601. For example, the input device 622 may be a keyboard and/or a mouse. The output device 624 may be any suitable device operable to provide output to a user of the computing device 601. For example, the output device 624 may be any conventional display screen and/or set of speakers. Although shown separately from the input device 622, those skilled in the art will appreciate that the output device 624 and the input device 622 may be suitably combined. For example, a display screen with an integrated touch-screen may be a combined input device 622 and output device 624.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects and embodiments described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or other such configurations).

The methods, sequences, and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in an IoT device. In the alternative, the processor and the non-transitory computer-readable medium may be discrete components in a user terminal.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects and embodiments, those skilled in the art will appreciate that various changes and modifications could be made herein without departing from the scope of the disclosure as defined by the appended claims. Furthermore, in accordance with the various illustrative aspects and embodiments described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method for combining load or store instructions, comprising:

identifying, in a processor pipeline, at least one pattern of multiple memory access instructions that reference a common base register and do not fully utilize an available bus width, wherein the multiple memory access instructions are one of an assembly code instruction or a compiled code instruction, wherein the at least one pattern of multiple memory access instructions is identified based on an attribute of each of the multiple memory access instructions and the attributes of the multiple memory access instructions are stored in a storage instruction table;

determining that the multiple memory access instructions target adjacent memory or non-contiguous memory that can fit on a single cache line based on the attributes of the multiple memory access instructions stored in the storage instruction table;

determining whether a one equivalent memory access instruction to replace the multiple memory access instructions creates a memory hazard where the one equivalent memory access instruction utilizes more of the available bus width than either of the replaced memory access instructions;

replacing, within the processor pipeline, the multiple memory access instructions with the one equivalent memory access instruction when the one equivalent memory access instruction does not create the memory hazard; and updating the storage instruction table to track the multiple memory access instructions replaced with the one equivalent memory access instruction.

2. The method recited in claim 1, wherein the multiple memory access instructions are replaced with the one equivalent memory access instruction in response to determining that the multiple memory access instructions appear consecutively in the processor pipeline and target the adjacent memory at contiguous offsets.

3. The method recited in claim 2, wherein the multiple memory access instructions target the adjacent memory at contiguous positive offsets.

4. The method recited in claim 2, wherein the multiple memory access instructions target the adjacent memory at contiguous negative offsets.

5. The method recited in claim 1, wherein the multiple memory access instructions utilize different portions of the available bus width.

6. The method recited in claim 1, further comprising determining that the multiple memory access instructions target the adjacent memory in response to the multiple memory access instructions including a first memory access instruction that alters a value stored in the common base register and a second memory access that accesses memory at a location adjacent to the altered value stored in the common base register.

7. The method recited in claim 1, further comprising determining that the multiple memory access instructions appear non-consecutively in the processor pipeline, wherein the multiple memory access instructions are replaced with the one equivalent memory access instruction in response to determining that no intervening store instructions appear between the non-consecutive memory access instructions.

8. The method recited in claim 1, further comprising determining that the multiple memory access instructions appear non-consecutively in the processor pipeline, wherein the multiple memory access instructions are replaced with the one equivalent memory access instruction in response to determining that one or more intervening store instructions appearing between the non-consecutive memory access instructions use the common base register referenced in the multiple memory access instructions and that there are no overlapping bytes between the non-consecutive memory access instructions and the one or more intervening store instructions.

9. The method recited in claim 1, wherein the multiple memory access instructions comprise multiple dynamic instances of the same memory access instruction.

10. The method recited in claim 1, wherein the multiple memory access instructions comprise multiple load instructions or multiple store instructions.

11. An apparatus, comprising:
a processor configured to identify, in a pipeline associated with the processor, at least one pattern of multiple memory access instructions that reference a common base register and do not fully utilize an available bus width, wherein the multiple memory access instructions are one of an assembly code instruction or a compiled code instruction, wherein the at least one pattern of multiple memory access instructions is identified based on an attribute of each of the multiple memory access instructions and the attributes of the multiple memory access instructions are stored in a storage instruction table, determine that the multiple memory access instructions target adjacent memory or non-contiguous memory that can fit on a single cache line based on the attributes of the multiple memory access instructions stored in the storage instruction table, determine whether a one equivalent memory access instruction to replace the multiple memory access instructions creates a memory hazard where the one equivalent memory access instruction utilizes more of the available bus width than either of the replaced memory access instructions, replace, within the pipeline associated with the processor, the multiple memory access instructions with the one equivalent memory access instruction when the one equivalent memory access instruction does not create the memory hazard, and update the storage instruction table to track the multiple memory access instructions replaced with the one equivalent memory access instruction.

12. The apparatus recited in claim 11, wherein the multiple memory access instructions are replaced with the one equivalent memory access instruction in response to the multiple memory access instructions appearing consecutively in the pipeline and targeting the adjacent memory at contiguous offsets.

13. The apparatus recited in claim 12, wherein the multiple memory access instructions target the adjacent memory at contiguous positive offsets.

14. The apparatus recited in claim 12, wherein the multiple memory access instructions target the adjacent memory at contiguous negative offsets.

15. The apparatus recited in claim 11, wherein the multiple memory access instructions utilize different portions of the available bus width.

16. The apparatus recited in claim 11, wherein the processor is further configured to determine that the multiple memory access instructions target the adjacent memory in response to the multiple memory access instructions including a first memory access instruction that alters a value stored in the common base register and a second memory access that accesses memory at a location adjacent to the altered value stored in the common base register.

17. The apparatus recited in claim 11, wherein the processor is further configured to determine that the multiple memory access instructions appear non-consecutively in the processor pipeline and to replace the multiple memory access instructions with the one equivalent memory access instruction if no intervening store instructions appear between the non-consecutive memory access instructions.

18. The apparatus recited in claim 11, wherein the processor is further configured to determine that the multiple memory access instructions appear non-consecutively in the processor pipeline and to replace the multiple memory access instructions with the one equivalent memory access instruction if one or more intervening store instructions appearing between the non-consecutive memory access instructions use the common base register referenced in the multiple memory access instructions and there are no overlapping bytes between the non-consecutive memory access instructions and the one or more intervening store instructions.

19. The apparatus recited in claim 11, wherein the multiple memory access instructions comprise multiple dynamic instances of the same memory access instruction.

20. The apparatus recited in claim 11, wherein the multiple memory access instructions comprise multiple load instructions or multiple store instructions.

21. An apparatus, comprising:
means for identifying, in a processor pipeline, at least one pattern of multiple memory access instructions that reference a common base register and do not fully utilize an available bus width, wherein the multiple memory access instructions are one of an assembly code instruction or a compiled code instruction, wherein the at least one pattern of multiple memory access instructions is identified based on an attribute of each of the multiple memory access instructions and the attributes of the multiple memory access instructions are stored in a storage instruction table;
means for determining that the multiple memory access instructions target adjacent memory or non-contiguous memory that can fit on a single cache line based on the attributes of the multiple memory access instructions stored in the storage instruction table;
means for determining whether a one equivalent memory access instruction to replace the multiple memory access instructions creates a memory hazard where the one equivalent memory access instruction utilizes more of the available bus width than either of the replaced memory access instructions;
means for replacing, within the processor pipeline, the multiple memory access instructions with the one equivalent memory access instruction when the one equivalent memory access instruction does not create the memory hazard; and
means for updating the storage instruction table to track the multiple memory access instructions replaced with the one equivalent memory access instruction.

22. The apparatus recited in claim 21, wherein the multiple memory access instructions are replaced with the one equivalent memory access instruction in response to the multiple memory access instructions appearing consecutively in the processor pipeline and targeting the adjacent memory at contiguous offsets.

23. The apparatus recited in claim 22, wherein the multiple memory access instructions target the adjacent memory at contiguous positive offsets.

24. The apparatus recited in claim 22, wherein the multiple memory access instructions target the adjacent memory at contiguous negative offsets.

25. The apparatus recited in claim 21, wherein the multiple memory access instructions utilize different portions of the available bus width.

26. The apparatus recited in claim 21, further comprising means for determining that the multiple memory access instructions target the adjacent memory in response to the multiple memory access instructions including a first memory access instruction that alters a value stored in the common base register and a second memory access that accesses memory at a location adjacent to the altered value stored in the common base register.

27. The apparatus recited in claim 21, further comprising means for determining that the multiple memory access instructions appear non-consecutively in the processor pipeline, wherein the multiple memory access instructions are replaced with the one equivalent memory access instruction if no intervening store instructions appear between the non-consecutive memory access instructions.

28. The apparatus recited in claim 21, further comprising means for determining that the multiple memory access instructions appear non-consecutively in the processor pipeline, wherein the multiple memory access instructions are replaced with the one equivalent memory access instruction if one or more intervening store instructions appearing between the non-consecutive memory access instructions use the common base register referenced in the multiple memory access instructions and there are no overlapping bytes between the non-consecutive memory access instructions and the one or more intervening store instructions.

29. The apparatus recited in claim 21, wherein the multiple memory access instructions comprise multiple dynamic instances of the same memory access instruction.

30. The apparatus recited in claim 21, wherein the multiple memory access instructions comprise multiple load instructions or multiple store instructions.

31. A non-transitory computer-readable medium having computer-executable instructions recorded thereon, the computer-executable instructions configured to cause a processor to:
identify, in a pipeline associated with the processor, at least one pattern of multiple memory access instructions that reference a common base register and do not fully utilize an available bus width, wherein the multiple memory access instructions are one of an assembly code instruction or a compiled code instruction, wherein the at least one pattern of multiple memory access instructions is identified based on an attribute of each of the multiple memory access instructions and the attributes of the multiple memory access instructions are stored in a storage instruction table;
determine that the multiple memory access instructions target adjacent memory or non-contiguous memory that can fit on a single cache line based on the attributes of the multiple memory access instructions stored in the storage instruction table;
determine whether a one equivalent memory access instruction to replace the multiple memory access instructions creates a memory hazard where the one equivalent memory access instruction utilizes more of the available bus width than either of the replaced memory access instructions;
replace, within the pipeline associated with the processor, the multiple memory access instructions with the one equivalent memory access instruction when the one equivalent memory access instruction does not create the memory hazard; and update the storage instruction table to track the multiple memory access instructions replaced with the one equivalent memory access instruction.

32. The non-transitory computer-readable medium recited in claim 31, wherein the multiple memory access instructions are replaced with the one equivalent memory access instruction in response to the multiple memory access instructions appearing consecutively in the pipeline and targeting the adjacent memory at contiguous offsets.

33. The non-transitory computer-readable medium recited in claim 32, wherein the multiple memory access instructions target the adjacent memory at contiguous positive offsets.

34. The non-transitory computer-readable medium recited in claim 32, wherein the multiple memory access instructions target the adjacent memory at contiguous negative offsets.

35. The non-transitory computer-readable medium recited in claim 31, wherein the multiple memory access instructions utilize different portions of the available bus width.

36. The non-transitory computer-readable medium recited in claim 31, wherein the computer-executable instructions are further configured to cause the processor to determine that the multiple memory access instructions target the adjacent memory in response to the multiple memory access instructions including a first memory access instruction that alters a value stored in the common base register and a second memory access that accesses memory at a location adjacent to the altered value stored in the common base register.

37. The non-transitory computer-readable medium recited in claim 31, wherein the computer-executable instructions are further configured to cause the processor to determine that the multiple memory access instructions appear non-consecutively in the processor pipeline and to replace the multiple memory access instructions with the one equivalent memory access instruction if no intervening store instructions appear between the non-consecutive memory access instructions.

38. The non-transitory computer-readable medium recited in claim 31, wherein the computer-executable instructions are further configured to cause the processor to determine that the multiple memory access instructions appear non-consecutively in the processor pipeline and to replace the multiple memory access instructions with the one equivalent memory access instruction if one or more intervening store instructions appearing between the non-consecutive memory access instructions use the common base register referenced in the multiple memory access instructions and there are no overlapping bytes between the non-consecutive memory access instructions and the one or more intervening store instructions.

39. The non-transitory computer-readable medium recited in claim 31, wherein the multiple memory access instructions comprise multiple dynamic instances of the same memory access instruction.

40. The non-transitory computer-readable medium recited in claim 31, wherein the multiple memory access instructions comprise multiple load instructions or multiple store instructions.

\* \* \* \* \*